United States Patent
Lampes

(10) Patent No.: US 6,357,752 B1
(45) Date of Patent: Mar. 19, 2002

(54) BRUSH SEAL

(75) Inventor: Elias H. Lampes, Lynnfield, MA (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 09/418,718

(22) Filed: Oct. 15, 1999

(51) Int. Cl.[7] .............................. F01D 11/02; F16J 15/44
(52) U.S. Cl. ....................................................... 277/355
(58) Field of Search .......................................... 277/355

(56) References Cited

U.S. PATENT DOCUMENTS

| | | | |
|---|---|---|---|
| 5,181,728 A | * | 1/1993 | Stec .............................. 277/53 |
| 5,318,309 A | | 6/1994 | Tseng et al. .................... 277/53 |
| 5,568,931 A | | 10/1996 | Tseng et al. ................... 277/53 |

* cited by examiner

Primary Examiner—Anthony Knight
Assistant Examiner—Matthew E. Rodgers
(74) Attorney, Agent, or Firm—Andrew C. Hess; Rodney M. Young

(57) ABSTRACT

A double brush seal for sealing the combustor-turbine nozzle interface of a gas turbine engine includes a stationary support member and an intermediate plate attached to the stationary support member. The brush seal also includes a first end plate located upstream of the intermediate plate and attached to the stationary support member, and a second end plate located downstream of the intermediate plate and attached to the stationary support member. A first bristle pack is disposed between the first end plate and the intermediate plate, and a second bristle pack is disposed between the second end plate and the intermediate plate such that the intermediate plate functions as a common back plate for the two stages of the seal.

13 Claims, 2 Drawing Sheets

BRUSH SEAL

STATEMENT REGARDING FEDERALLY SPONSORED RESEARCH & DEVELOPMENT

The U.S. Government may have certain rights in this invention pursuant to contract number DAHH 10-98-C-0023 awarded by the Department of Defense.

BACKGROUND OF THE INVENTION

This invention relates generally to brush seals and more particularly to a brush seal for use in gas turbine engines.

A gas turbine engine operates according to well known principles wherein an incoming stream of atmospheric air flows through the engine along an axially extending flow path. At least a portion of the incoming air is compressed in a compressor section of the engine and then mixed with fuel and burned in a combustor section to produce a high energy, high temperature exhaust gas stream. The hot gas stream exits the combustor and subsequently passes through a turbine section that extracts energy from the exhaust gas stream to power the compressor and provide useful work such as powering an aircraft in flight. The turbine section typically includes a stationary turbine nozzle disposed at the outlet of the combustor for channeling combustion gases into the turbine rotor disposed downstream thereof.

Uncontrolled leakage of gases—such as atmospheric air, exhaust gases, or other—within the engine contributes to a reduced engine efficiency. Seals are used to control this energy loss by interposing them in a leakage path to reduce the volume or mass of gas passing from one part of the engine to another. The so-called E-seals or W-seals are commonly used in gas turbine engines for sealing between static components. One such location that is particularly difficult to seal is the interface between the combustor and the turbine nozzle due to the high relative movement and high temperatures in the region. Brush seals can withstand the high relative movements in the radial and axial directions and therefore are good candidates for sealing this interface. Double brush seals are particularly good candidates because they are capable of sealing both the combustor and the turbine nozzle.

A typical double brush seal includes at least two seal stages with each stage including a bristle pack having a plurality of bristles. The bristle pack of each stage is disposed between a front plate (i.e., a plate facing a higher pressure) and a back plate with adjacent stages being spaced apart a specified distance. The fixed ends of the bristles are usually attached to one engine part, and the free ends of the bristles are disposed in sealing engagement with a sealing surface on another engine part. Brush seals are not intended to function so as to completely seal one engine section from another, but rather rely upon the tortuous flow path created between the bristles to reduce gas flow therethrough and to control the pressure drop between the engine sections. Typically, the leakage flow and pressure drop are in the same direction for each stage of the brush seal.

Although a good candidate for sealing the combustor-turbine nozzle interface, conventional double brush seals can be difficult to install at that location because of the spacing between the stages and because each seal stage requires two plates. The multiple plates also increase the cost and weight of the sealing arrangement.

Accordingly, there is a need for a double brush seal for sealing the combustor-turbine nozzle interface of a gas turbine engine that is relatively easy to install and uses fewer parts than conventional double brush seals.

SUMMARY OF THE INVENTION

The above-mentioned need is met by the present invention which provides a brush seal for sealing the combustor-turbine nozzle interface of a gas turbine engine. The brush seal comprises a stationary support member and an intermediate plate attached to the stationary support member. The brush seal also includes a first end plate located upstream of the intermediate plate and attached to the stationary support member, and a second end plate located downstream of the intermediate plate and attached to the stationary support member. A first bristle pack is disposed between the first end plate and the intermediate plate, and a second bristle pack is disposed between the second end plate and the intermediate plate.

The present invention and its advantages over the prior art will become apparent up)on reading the following detailed description and the appended claims with reference to the accompanying drawings.

DESCRIPTION OF THE DRAWINGS

The subject matter which is regarded as the invention is particularly pointed out and distinctly claimed in the concluding part of the specification. The invention, however, may be best understood by reference to the following description taken in conjunction with the accompanying drawing figures in which

DETAILED DESCRIPTION OF THE INVENTION

Figure 1:
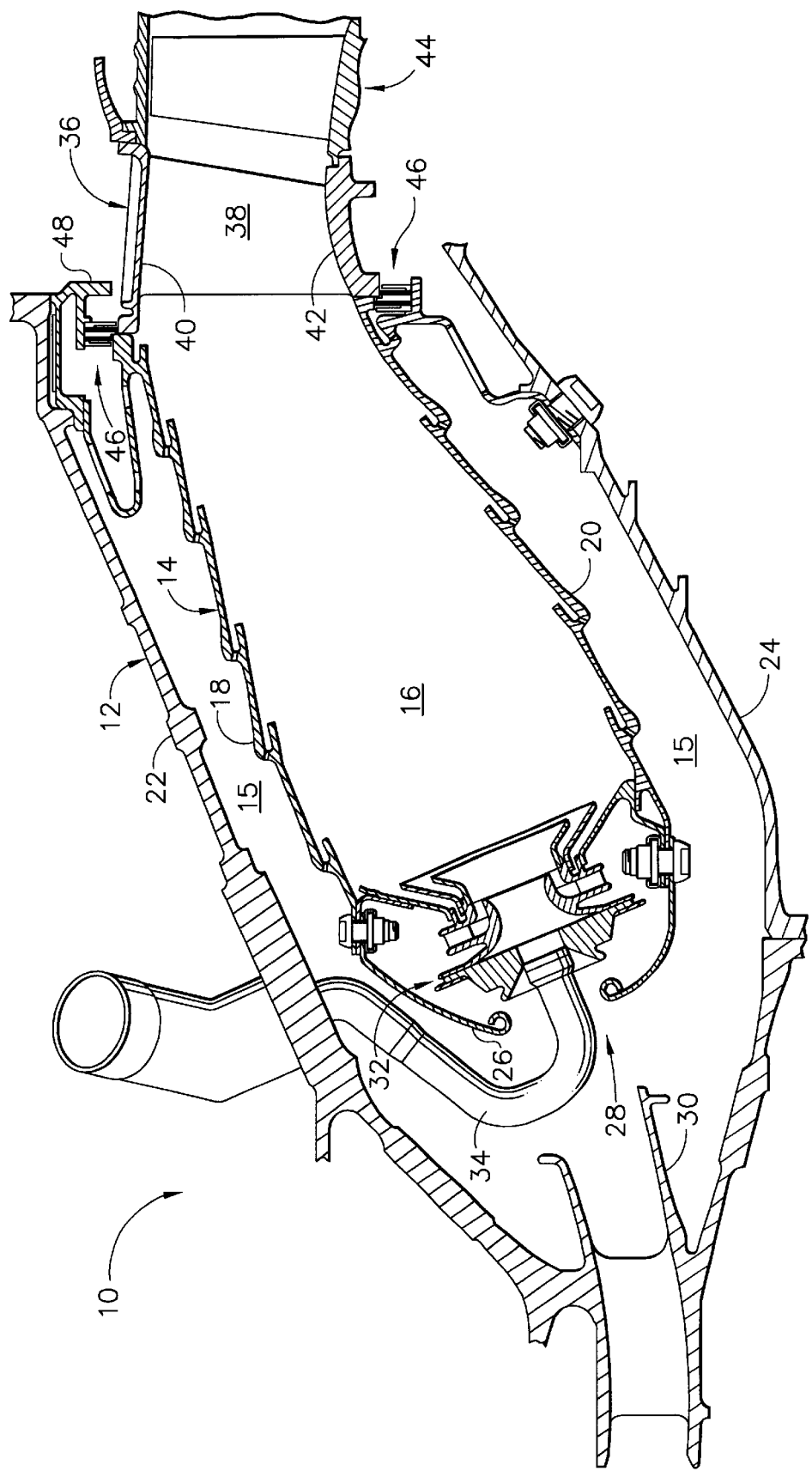
FIG. 1 is a longitudinal cross-sectional view of a portion of a gas turbine engine having the double brush seal of the present invention.

Referring to the drawings wherein identical reference numerals denote the same elements throughout the various views, FIG. 1 shows a portion of a gas turbine engine 10 having a combustor 12. The combustor 12 includes a hollow body 14 defining a combustion chamber 16 therein. The hollow body 14 is generally annular in form and is defined by a radially outer liner 18 and a radially inner liner 20 disposed between a radially outer combustor casing 22 and a radially inner combustor casing 24. The outer and inner liners 18 and 20 are spaced from the outer and inner combustor casings 22 and 24, respectively, so as to define an annular volume 15 disposed around the exterior of the hollow body 14.

The upstream end of the hollow body 14 is substantially dosed off by a cowl 26 attached to the outer and inner liners 18 and 20 by suitable fasteners. An opening 28 is formed in the cowl 26 for the introduction of fuel and compressed air The compressed air is introduced into the combustor 12 from a compressor (not shown) via a diffuser 30. The compressed air passes primarily through the opening 28 and into the combustion chamber 16 to support combustion and partially into the annular volume 15 where it is used to cool both the liners 18 and 20 and turbomachinery further downstream.

A plurality of circumferentially spaced swirler assemblies 32 (one shown in FIG. 1) is mounted inside the cowl 26. Each swirler assembly 32 receives compressed air through the opening 28 and fuel from a corresponding fuel tube 34. The fuel and air are swirled and mixed by the swirler assemblies 32, and the resulting fuel/air mixture flows into the combustion chamber 16 where it is ignited for generating hot combustion gases. The hot combustion gases are discharged to a stationary turbine nozzle 36 located downstream of the combustor 12. The turbine nozzle 36 includes a plurality of circumferentially spaced vanes 38 (only one shown in FIG. 1) that are supported between a number of arcuate outer bands 40 3007 9 and arcuate inner bands 42. The vanes 38 channel the combustion gases to a conventional turbine rotor 44 that extracts energy therefrom in a well known manner.

The forward ends of the radially outer and inner bands 40 and 42 abut the aft ends of the outer and inner liners 18 and 20, respectively, thereby defining radially outer and inner interfaces between the combustor 12 and the turbine nozzle 36. Each interface has an external side that is exposed to the cooling air in the annular volume 15 and an internal side that is exposed to the hot gas stream flowing through the combustor 12 and the turbine nozzle 36. To prevent undesired leakage of cooling air through the radially inner and outer interfaces and into the hot gas stream, brush seals 46 are disposed at both interfaces, externally of the hot gas stream.

Figure 2:
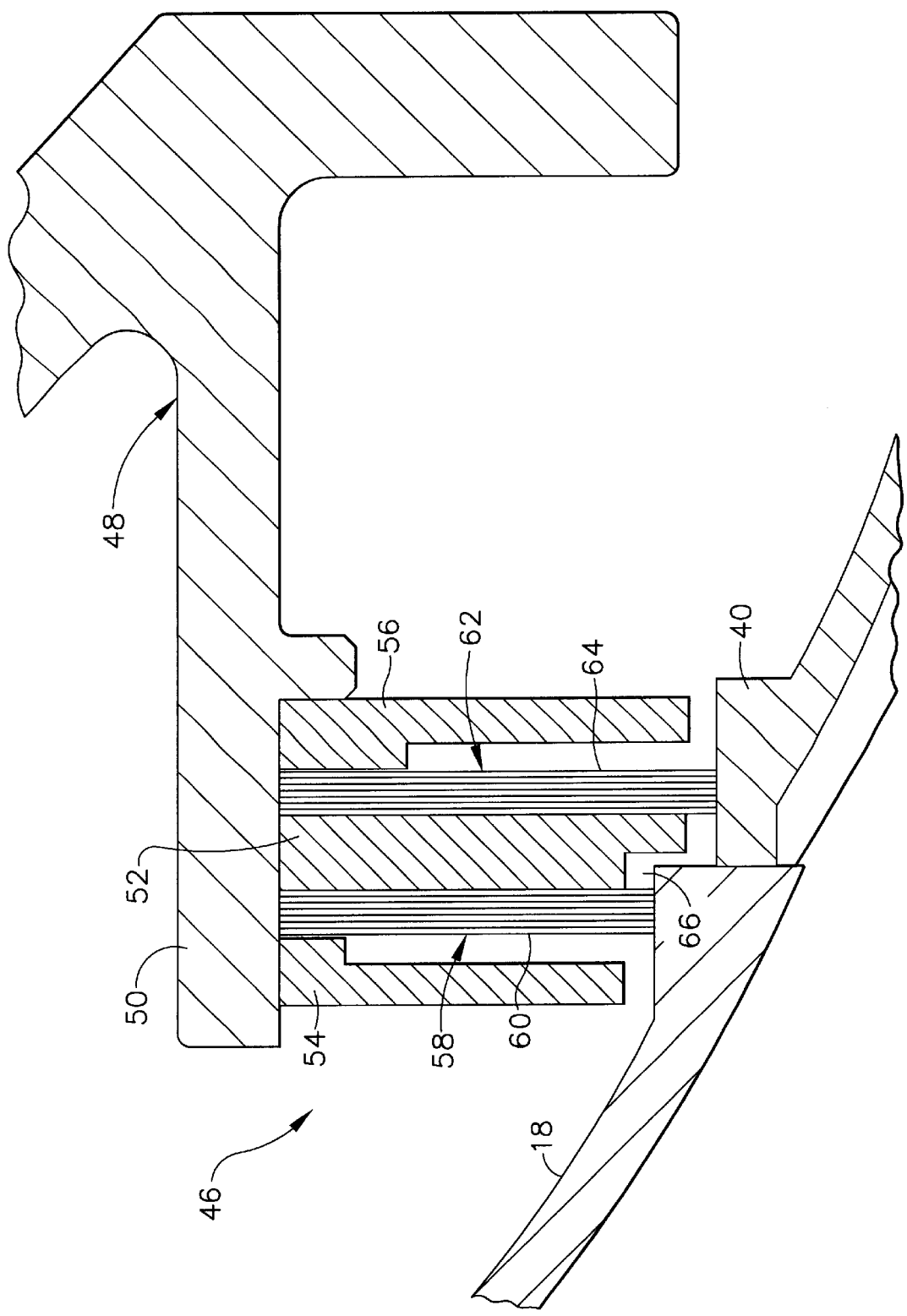
FIG. 2 is a detailed cross-sectional view of the brush seal of FIG. 1.

Turning now to FIG. 2, one preferred embodiment of the brush seal 46 of the present invention is shown in more detail. The seal 46 is disposed between Et stationary support member 48 and the outer interface of the combustor 12 and the turbine nozzle 36. The support member 48 is connected to the outer combustor casing 22, either by being fixedly attached to the outer casing 22 (as shown in FIG. 1) or by being integrally formed with the outer casing 22, so as to be substantially located in the annular volume 15. The support member 48 defines a cylindrical flange 50 that circumferentially surrounds the outer interface. The brush seal 46 includes an annular intermediate plate 52 attached at its radially outer circumferential edge to the support member flange 50 (and thus fixed with respect to the outer casing 22) and axially aligned with the outer interface. The intermediate plate 52 surrounds the outer interface, and its inner edge is spaced therefrom so as to not contact the combustor outer liner 18 or the outer nozzle band 40. As shown in FIG. 2, the inner edge of the intermediate plate 52 can be provided with a step to accommodate any discontinuity formed between the outer liner 18 and the outer nozzle band 40.

The brush seal 46 further includes a first end plate 54 located upstream of the intermediate plate 52, and a second end plate 56 located downstream of the intermediate plate 52. Both the first and second end plates 54 and 56 are annular plates attached their respective radially outer edges to the support member flange 50. The first end plate 54 is disposed around the outer combustor liner 18 with its inner edge spaced therefrom, and the second end plate 56 is disposed around the outer nozzle band 40 with its inner edge spaced therefrom.

A first bristle pack 58 having a plurality of bristles 60 is wedged between the intermediate plate 52 and the first end plate 54. The bristles 60 are arranged such that their radially outermost ends are secured to the support member flange 50 and their radially inner, free ends sealingly engage the outer surface of the outer combustor liner 18 near the combustor-turbine nozzle interface. Similarly, a second bristle pack 62 having a plurality of bristles 64 is wedged between the intermediate plate 52 and the second end plate 56. The bristles 64 are also arranged such that their outermost ends are secured to the support member flange 50 and their inner, free ends sealingly engage the outer surface of the outer nozzle band 40 near the combustor-turbine nozzle interface.

The bristles of both bristle packs 58 and 62 can be made of any suitable material, such as metallic or ceramic materials. Ceramic bristles are particularly useful in the present invention because of their capability to withstand high temperatures. The bristles 60 and 64 are somewhat flexible and are thus able to withstand relative movement in the radial and axial directions that may occur during an engine transient and still retain their sealing ability after the transient has passed. Examples of such transients include differential thermal growth between engine parts and engine vibrations. The intermediate plate 52 and the first and second end plates 54 and 56 are all preferably rigid plates, but, as discussed above, are adequately spaced from the outer combustor liner 18 and/or the outer nozzle band 40 so as to avoid contact therewith during such transients.

The brush seal 46 of the present invention is a double brush seal having a first stage (comprising the first bristle pack 58) located upstream of the combustor-turbine nozzle interface, and a second stage (comprising the second bristle pack 62) located downstream of the interface. While each stage generally seals cooling air from the interface, neither stage completely seals the interface. As in all brush seals, the bristles 60 and 64 reduce the flow of cooling air and thereby control the pressure drop, but allow some cooling air to flow though and into the space 66 defined by the radially inner edge of the intermediate plate 52, the bristle packs 58 and 62, the outer combustor liner 18 and the outer nozzle band 40. From the space 66, a small leakage flow of cooling air will pass into the hot gas stream through the interface. However, this small leakage flow will have a negligible impact on engine performance.

The present invention is unlike conventional brush seals in that the flow and pressure drop across the two stages are in opposite axial directions because the two seal stages are located on opposite sides of the interface. Accordingly, the first and second end plates 54 and 56, which face the flow, each functions in the manner of the front plate of a conventional brush seal for their respective stage, and the intermediate plate 52 functions as a common back plate for each stage.

It should be noted that although FIG. 2 shows the brush seal 46 located at the outer interface of the combustor 12 and turbine nozzle 36, the brush seals for the outer and inner interfaces are substantially the same and the foregoing description applies equally to the brush seals at either location. The primary differences of the inner brush seal with respect to the outer brush seal described above are that the stationary support member is connected to the inner combustor casing 24 and the first and second bristle packs sealingly engage the inner combustor liner 20 and the inner nozzle band 42, respectively.

The foregoing has described a brush seal for sealing the combustor-turbine nozzle interface of a gas turbine engine that is relatively easy to install and uses fewer parts than conventional double brush seals. While specific embodiments of the present invention have been described, it will be apparent to those skilled in the art that various modifications thereto can be made without departing from the spirit and scope of the invention as defined in the appended claims.

What is claimed is:

1. In a gas turbine engine having a combustor, a turbine nozzle and an interface between a combustor and a turbine nozzle, a brush seal comprising:

a stationary support member;

an intermediate plate attached to said stationary support member;

a first end plate located upstream of said intermediate plate and attached to said stationary support member;

a second end plate located downstream of said intermediate plate and attached to said stationary support member;

a first bristle pack disposed between said first end plate and said intermediate plate and located on a first side of said interface; and a second bristle pack disposed between said second end plate and said intermediate plate and located on a second side of said interface.

2. The brush seal of claim 1 wherein said first bristle pack includes a plurality of bristles, said bristles having free ends that sealingly engage said combustor.

3. The brush seal of claim 2 wherein said bristles sealing engage said combustor near said interface.

4. The brush seal of claim 1 wherein said second bristle pack includes a plurality of bristles, said bristles having free ends that sealingly engage said turbine nozzle.

5. The brush seal of claim 4 wherein said bristles sealing engage said turbine nozzle near said interface.

6. The brush seal of claim 1 wherein said intermediate plate is aligned with said interface.

7. The brush seal of claim 1 wherein said intermediate plate does not contact said combustor or said turbine nozzle.

8. The brush seal of claim 1 wherein said first and second end plates do not contact said combustor or said turbine nozzle.

9. The brush seal of claim 1 wherein said first bristle pack has a flow therethrough in a first direction and said second bristle pack has a flow therethrough in a second direction, opposite to said first direction.

10. In a gas turbine engine having a combustor, a turbine nozzle and an interface between a combustor and a turbine nozzle, a brush seal comprising:

a stationary support member;

an intermediate plate attached to said stationary support member in alignment with said interface;

a first end plate located upstream of said intermediate plate and attached to said stationary support member;

a second end plate located downstream of said intermediate plate and attached to said stationary support member;

a first bristle pack disposed between said first end plate and said intermediate plate, staid first bristle pack including a plurality of bristles, said bristles having free ends that sealingly engage said combustor; and a second bristle pack disposed between said second end plate and said intermediate plate, said second bristle pack including a plurality of bristles, said bristles having free ends that sealingly engage said turbine nozzle.

11. The brush seal of claim 10 wherein said intermediate plate does not contact said combustor or said turbine nozzle.

12. The brush seal of claim 10 wherein said first and second end plates do not contact said combustor or said turbine nozzle.

13. The brush seal of claim 10 wherein said first bristle pack has a flow therethrough in a first direction and said second bristle pack has a flow therethrough in a second direction, opposite to said first direction.

* * * * *